United States Patent
Hagan

(10) Patent No.: US 9,104,370 B2
(45) Date of Patent: *Aug. 11, 2015

(54) TABLET-TYPE DEVICE CONFIGURED FOR UNDERWATER OR SEVERE ENVIRONMENT

(71) Applicant: Mark Lloyd Hagan, Nyack, NY (US)

(72) Inventor: Mark Lloyd Hagan, Nyack, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/908,517

(22) Filed: Jun. 3, 2013

(65) Prior Publication Data

US 2013/0258571 A1     Oct. 3, 2013

Related U.S. Application Data

(63) Continuation-in-part of application No. 13/012,282, filed on Jan. 24, 2011, now Pat. No. 8,454,370, which is a continuation-in-part of application No. 11/899,258, filed on Sep. 4, 2007, now Pat. No. 7,874,843, which is a continuation-in-part of application No. 10/842,385, filed on May 10, 2004, now Pat. No. 7,264,477.

(60) Provisional application No. 60/471,489, filed on May 15, 2003.

(51) Int. Cl.
| | |
|---|---|
| *B43K 29/00* | (2006.01) |
| *G06F 1/16* | (2006.01) |
| *B43L 1/00* | (2006.01) |
| *B43L 3/00* | (2006.01) |
| *B63C 11/02* | (2006.01) |
| *B63C 11/26* | (2006.01) |
| *B43K 23/00* | (2006.01) |

(52) U.S. Cl.
CPC .............. *G06F 1/163* (2013.01); *B43K 23/001* (2013.01); *B43K 29/00* (2013.01); *B43L 1/002* (2013.01); *B43L 1/006* (2013.01); *B43L 3/005* (2013.01); *B43L 3/008* (2013.01); *B63C 11/02* (2013.01); *B63C 11/26* (2013.01)

(58) Field of Classification Search
CPC ..................................... B43L 1/00; B42L 1/06
USPC .......................................................... 434/408
See application file for complete search history.

(56) References Cited

U.S. PATENT DOCUMENTS

| | | | |
|---|---|---|---|
| 2,883,770 A | | 4/1959 | Lieb |
| 3,781,536 A | * | 12/1973 | Naeseth et al. ................. 362/34 |
| 4,083,136 A | * | 4/1978 | Zelenko ......................... 40/518 |
| 4,797,107 A | * | 1/1989 | Hatta et al. .................... 434/408 |
| 4,960,399 A | | 10/1990 | Lyon |
| 4,995,011 A | * | 2/1991 | Spiesberger ................. 367/127 |
| 4,995,015 A | | 2/1991 | Chiang |
| 5,083,242 A | * | 1/1992 | Piotrowski ...................... 362/34 |
| 5,361,169 A | * | 11/1994 | Deal ............................. 359/838 |
| 5,447,215 A | | 9/1995 | Volkmar et al. |
| 5,956,291 A | | 9/1999 | Nehemiah et al. |
| 6,098,793 A | | 8/2000 | Jaksha |
| 6,116,484 A | * | 9/2000 | Allen ............................ 224/197 |

(Continued)

*Primary Examiner* — Michael Dennis
*Assistant Examiner* — Dolores Collins
(74) *Attorney, Agent, or Firm* — Cooper & Dunham LLP

(57) ABSTRACT

A tablet-type device that is suitable for use underwater or in a severe environment is provided. A length of waterproof vellum is stretched between two rollers to form a surface for recording information. The tablet is designed to be very easy to manipulate underwater, such as not to sink or ascend rapidly if let go. On the other hand, the device also includes provisions to allow the device to be secured to the user, another device, a surface, etc.

13 Claims, 16 Drawing Sheets

(56) References Cited

U.S. PATENT DOCUMENTS

| | | | | |
|---|---|---|---|---|
| 6,161,740 | A * | 12/2000 | Allen | 224/197 |
| 6,652,086 | B1 * | 11/2003 | Tomida et al. | 347/101 |
| 7,144,254 | B2 | 12/2006 | Meyerrose | |
| 7,264,477 | B1 * | 9/2007 | Hagan | 434/408 |
| 7,731,501 | B2 * | 6/2010 | Hagan | 434/408 |
| 7,874,843 | B2 * | 1/2011 | Hagan | 434/408 |
| 8,454,370 | B2 * | 6/2013 | Hagan | 434/408 |
| 2004/0197758 | A1 | 10/2004 | Langford | |
| 2011/0169256 | A1 | 7/2011 | Hagan | |

* cited by examiner

Dive Safety Check List

Fig. 14

Pre-Dive prep
Additions:_____
_____
_____

B) Plan your Dive (dive your plan)
- Consider the conditions
- Time, depth, return air
- Know the current direction and strength
C) Review communications and separation plan with dive buddy
D) Review computer manual, check battery, fill in Computer Reference Area (Go to Area 4, below)
E) Refrain from alcohol consumption before diving
2. Gear Set Up (in order)
A) Put on wet suit
B) Secure BC to Tank
___ Wet straps
___ Lower straps over the tank
___ The tank valve opening should face the BC
___ The top of the BC should be even with the tank valve
___ Secure BC straps
___ Check that the BC straps are tight enough by lifting the
Tank with the BC shoulder straps
C) Attach the Regulator First Stage to the Tank Valve
___ Remove Tank Valve cover
___ Clean tank valve with short burst of air by turning knob on tank clockwise.
___ Unscrew knob on the regulator First Stage and remove the dust cover
___ Attach the First Stage to the tank with the Second Stage and Alternate (Octopus) regulators on the RIGHT SIDE of the BC and the console on the LEFT.
___ Tighten regulator First Stage Yoke Screw so it is fingertight, do not over tighten.
___ Attach inflator hose of Regulator First Stage to Intake Valve on BC.
D) Turn ON Air
___ Hold instrument console so that the gauges face down and away.
___ With other hand slowly open the tank valve by turning it counterclockwise.
___ Listen for leaks. If there are any, repeat step C to clean and reset valve.
___ Open tank valve completely and then turn back a half turn.
___ Check pressure gauge for air pressure (with air integrated computers, wet contacts).
E) Test Second Stage Regulators, Primary and Alternate,
by pressing purge buttons and breathing through.
F) Secure Tank and BC
___ On a boat, secure to the tank rack
___ Lay down and with BC up and secure, avoid contact with sand and dirt.
G) Prepare Weights
___ With a weight belt, always carry it with the right hand at the free end, opposite the buckle. Place belt on floor with buckle on left side. Using both hands, hold each end of belt, step in and raise belt to waist. The buckle should now be on the left, so that it can be released with the right hand. Pass free end on right through buckle and secure.
___ Integrated systems follow BC manufacturers Instructions.

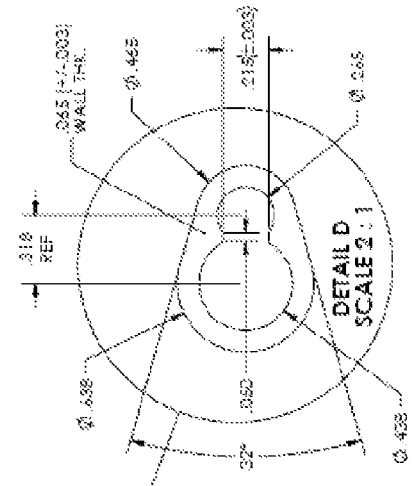
Fig. 15E
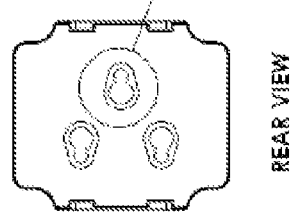
Fig. 15D
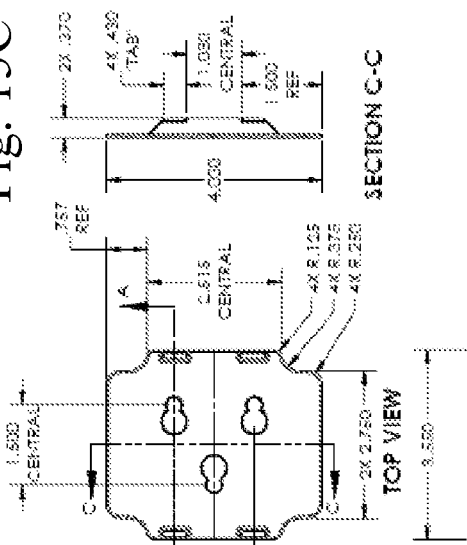
Fig. 15C
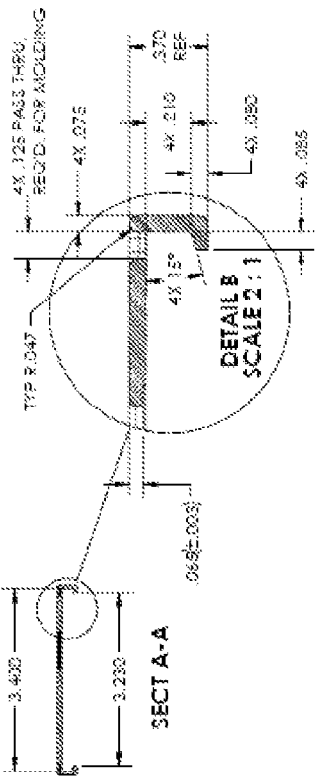
Fig. 15H
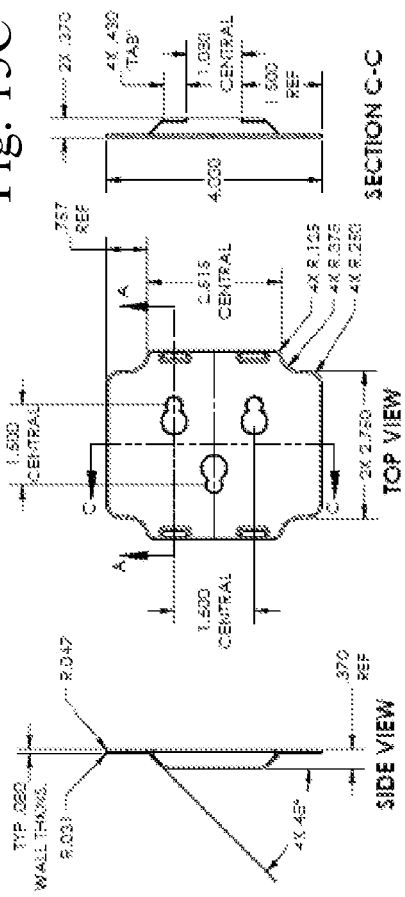
Fig. 15A  Fig. 15B
Fig. 15F  Fig. 15G

TABLET-TYPE DEVICE CONFIGURED FOR UNDERWATER OR SEVERE ENVIRONMENT

CROSS REFERENCE TO RELATED APPLICATIONS

This disclosure is a continuation-in-part of U.S. patent application Ser. No. 13/012,282 filed Jan. 24, 2011 which in turn is a continuation-in-part of U.S. patent application Ser. No. 11/899,258 filed Sep. 4, 2007 (now U.S. Pat. No. 7,874, 843) which in turn is a continuation-in-part of U.S. patent application Ser. No. 10/842,385 filed May 10, 2004 (now U.S. Pat. No. 7,264,477), which claims the benefit of U.S. Provisional Application No. 60/471,489, filed May 15, 2003. In addition, related U.S. patent application Ser. No. 11/897,968 filed Aug. 31, 2007 (now U.S. Pat. No. 7,731,501) is a divisional of application Ser. No. 10/842,385.

TECHNICAL FIELD

The present disclosure relates to writing/drawing tablets configured for an underwater or other extreme environment, and more particularly such tablet-type devices including means for fastening the tablet to the user or to another device or surface.

BACKGROUND ART

There are many reasons a scuba diver may need to write or draw underwater. For example, a diver may need or wish to communicate with other divers. In addition, the diver may desire to record notes, to aid in gathering reference material, architectural drafting for marine construction, artistic rendering, etc.

Conventionally, most underwater communications are accomplished with hand signals, dive slates and/or electronic instruments. Hand signals can be confusing and are limited in what they can communicate.

Dive slates are limited in the amount that they can record by the size of the slate. When the slate is full, new writing can only be added by erasing all previous work. In urgent situations this erasing time can be inconvenient.

Use of electronic equipment is expensive and often vulnerable in the underwater environment.

Use of multiple pages of waterproof material on a clipboard underwater is awkward because in the marine environment the pages can stick together and are difficult to manipulate especially if the diver is wearing gloves. Multiple page slates also cannot be reused until all previous work has been erased.

Use of a compact note scroll configured with a base on which a pair of rotatably mounted shafts carry an elongated strip of paper, an intermediate portion of which is accessible through a window aperture in a case which covers the base, is proposed in U.S. Pat. No. 4,083,136 (Zelenko). Although Zelenko proposes that the paper can be replaced by coated flexible plastic, so that writing on the strip can be easily erased by rubbing with a cloth or the like, writing on the plastic would readily fade, dissolve or otherwise be removed from the plastic, when under water. The compact note scroll proposed by Zelenko is simply not suitable for the underwater environment.

BRIEF SUMMARY

According to an aspect of the present disclosure, a tablet-type device is provided for use underwater or in a severe environment. A length of waterproof vellum is stretched between two rollers to form a surface for recording information. The device is designed to be very easy to manipulate underwater (such as not to sink or ascend rapidly if let go), but also includes provisions to allow the device to be secured to the user, another device, a surface, etc.

It is desirable, particularly in the aforementioned environments, for the device to be configured to maintain a consistent tension in the vellum sheet when the vellum is loaded on the roller. A tension adjustment mechanism grasps the vellum when the vellum is loaded on the roller and maintains a consistent tension on the vellum between the rollers, to maintain a flat recording surface while preventing the vellum from becoming disengaged from the rollers during use.

In another aspect, the device does not retain air in an underwater environment and does not retain water when removed from the underwater environment.

In another aspect, the device can be made of one or more materials that are resistant to corrosion and/or impervious to salt water and intensive exposure to sunlight.

BRIEF DESCRIPTION OF THE DRAWINGS

The aforementioned and other aspects, features and advantages can be more readily understood from the following detailed description with reference to the accompanying drawings wherein:

FIG. 14 illustrates an example of dive information (segment of a pre-printed dive safety check list) that can be prerecorded on a vellum sheet for a dive;

FIG. 15A illustrates a side view of a holder device;

FIG. 15B illustrates a top view of the holder device;

FIG. 15C illustrates a sectional view of section C-C of the holder device;

FIG. 15D illustrates a rear view of the holder device;

FIG. 15E illustrates a detailed view of a keyhole of the holder device;

FIG. 15F illustrates an end view of the holder device;

FIG. 15G illustrates a sectional view of section A-A of the holder device;

FIG. 15H illustrates a detailed view of subsection B of the section A-A shown in FIG. 15G.

DETAILED DESCRIPTION OF EXEMPLARY EMBODIMENTS

Figure 1:
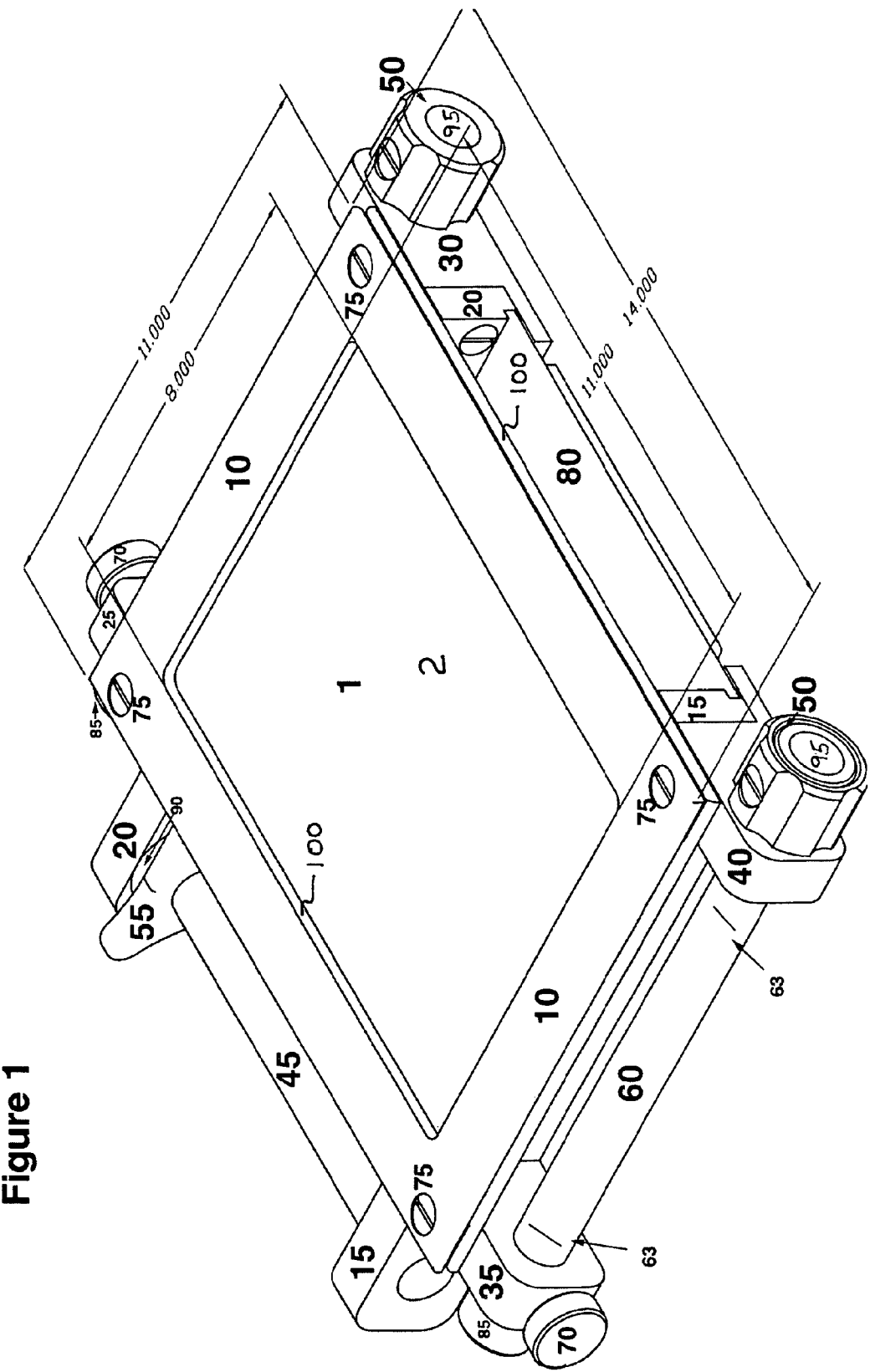
FIG. 1 is a perspective view of a drawing tablet, according to an exemplary embodiment of the present disclosure.

In describing examples and preferred embodiments illustrated in the drawings, specific terminology is employed for the sake of clarity in this patent specification. However, this disclosure is not intended to be limited to the specific terminology so selected and it is to be understood that each specific element includes all technical equivalents that operate in a similar manner. In addition, a detailed description of known functions and configurations will be omitted when it may obscure the subject matter of the present disclosure. In the description below, like reference numerals are used to describe the same, similar or corresponding parts in the several views of the drawing.

A drawing tablet according to a first embodiment of the present disclosure is a hand held device as shown in FIG. 1. The diver can draw or write continuously, accessing various writing instruments such as pencils (not shown) stored in a drawer 80 and advancing a plastic writing material easily with one hand while the other stabilizes the tablet through the use of a handle 45 on one side. On the other hand, the handle 45 can have other uses as well. For example, a strap may be looped around the handle and secured by hook and loop material, and other provisions on the other end of the strap can be employed to secure the strap to the user, another device, a surface, etc.

The tablet is designed, through the use of buoyant materials such as polystyrene, to have a slightly negative buoyancy at a depth of about fifty feet so that it can be very easy to manipulate underwater and will not sink or ascend rapidly if let go.

Underneath the face plate 1 used as a drawing table is a retractable drawer 80 to hold drawing instruments (not shown) through the use of a hook and loop material on its surface and that of the drawing instrument holders. The drawer 80 can be locked in an extended position or in a retracted position. The drawer 80 does not have sides so that it will not retain air or water during entrances or exits of the water's surface.

On each end of the face plate 1 used as a drawing table are rollers 60 and 65 for holding lengths of plastic vellum (not shown for clarity) used as the drawing medium. Through the use of grips 50 on the ends of the rollers 60 and 65 the plastic vellum 2 can be wound from one roller to the other as it is used.

The submersible drawing tablet parts are constructed of various plastic resin materials that are impervious to salt water such as polycarbonate, acrylic Plexiglas and polystyrene. The acrylic Plexiglas is produced in bright florescent colors so that the pallet can be located easily if it is set aside underwater where visibility can be poor.

The submersible drawing tablet is designed so that it can easily be disassembled for travel.

The first embodiment of the submersible writing and drawing tablet will now be described by referring to FIGS. 1-6. The overall submersible writing and drawing tablet is shown in FIG. 1.

All writing and illustration is done on rolls of plastic vellum with a writing instrument such as a graphite pencil. The vellum 2 is wound onto the lower vellum roller 60. The lower roller 60 is made of buoyant polystyrene and has a small diagonal vellum slot 63 on each side of the roller to grasp the vellum as it is being loaded onto the roller. The lower roller 60 is supported by the left and right lower roller supports 35 and 40. The lower roller 60 extends past the left and right roller supports 35 and 40 and is held in place by the left roller end knob 85 on the left and the rotation knob 50 and the right roller end knob on the right. The vellum 2 is advanced or rewound by turning the rotation knobs 50. The plastic vellum 2 (not shown for clarity) extends from the lower roller 60, over the face plate 1 and is attached to the upper vellum roller 65 (not visible in FIG. 1) by means of two other diagonal vellum slots 63 shown in FIGS. 1 and 5. The face plate 1 is constructed of phosphorescent polypropylene or Plexiglas to accommodate working in low light conditions. The face plate 1 can also include a grid (not shown) as a drawing aid. As an alternative, the vellum can include pre-printed grid lines and/or points The upper vellum roller 65 is held in place by the right and left roller supports 25 and 30, the right roller end knob 85 on the left and the rotation knob 50 and the right roller end knob 95 on the right.

The upper roller supports 25 and 30 are connected to the upper support rail 20 by two ⅜" flat head nylon screws 75. The lower roller supports 35 and 40 are connected to the lower support rail 15 by two ⅜" flat head nylon screws 75 shown in FIGS. 1 and 6. The vellum 2 is held tightly against the face plate 1 by use of the roller tension adjustment knobs 70 that apply pressure when turned clockwise to the upper and lower vellum rollers 60 and 65. The vellum 2 also can be held in place on the face plate 1 by use of vellum guides 120 (FIGS. 12A and 12B) located on the face plate 1 and by use of the drawing frame 10 (like other parts of tablet, preferably made of buoyant material, such as polystyrene, to have a slightly negative buoyancy at a depth of about fifty feet). The drawing frame 10 and the face plate 1 are attached to the upper and lower roller supports through separators 100 by four nylon screws 75 located in each corner. Vellum 2 travels between drawing frame 10 and face plate 1.

Figure 3:
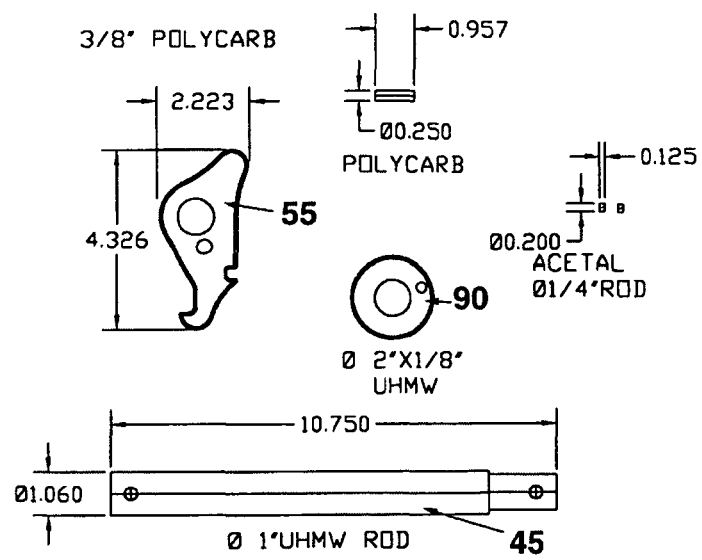
FIG. 3 is a detailed diagram showing a drawer latch assembly and handle of the embodiment shown in FIG. 1.
Figure 4:
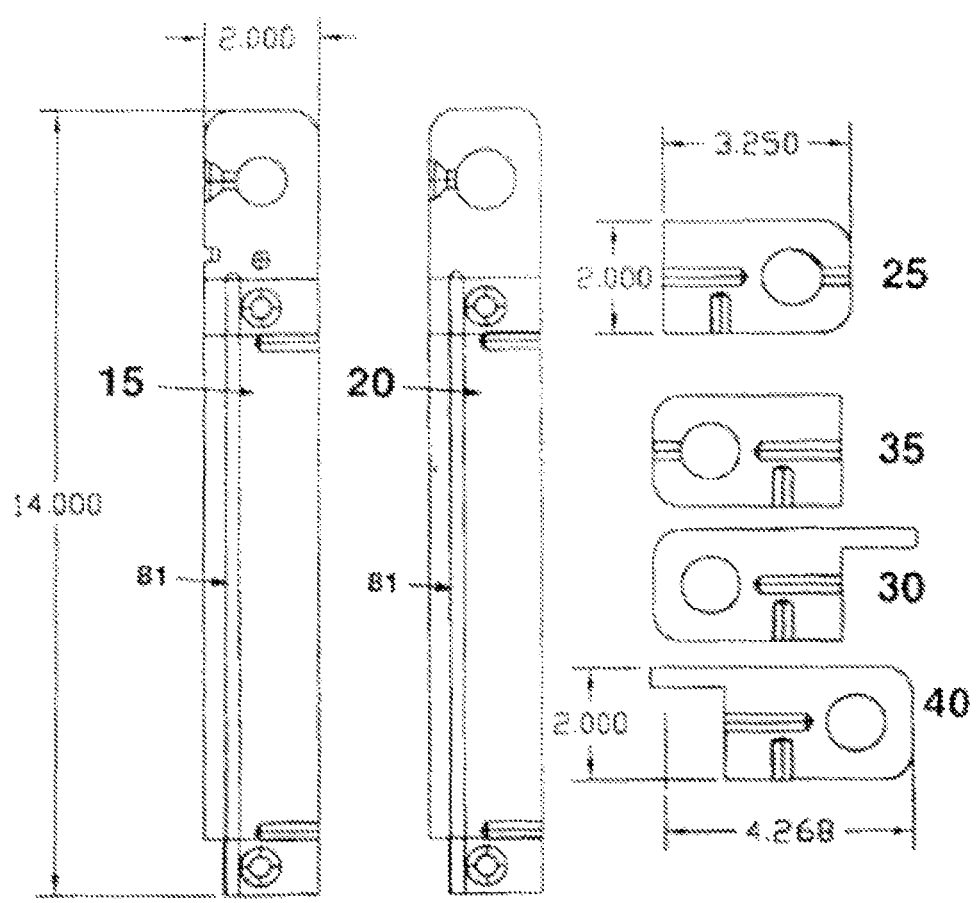
FIG. 4 is a detailed diagram showing support rails and roller supports of the embodiment shown in FIG. 1.
Figure 5:
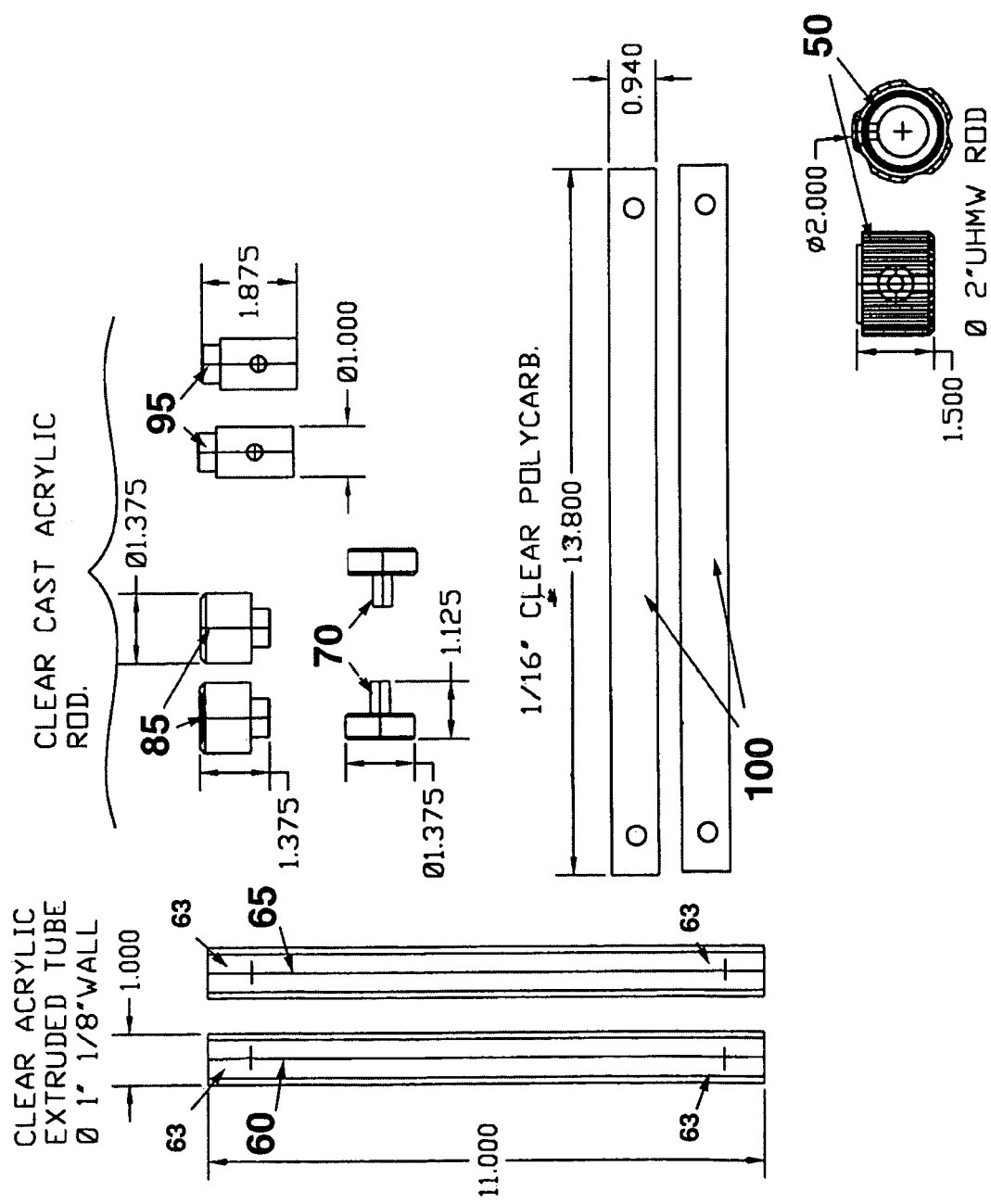
FIG. 5 is a detailed diagram showing rollers and knobs of the embodiment shown in FIG. 1.

The upper and lower support rails 20 and 15 extend beyond the left side of the face plate 1 and drawing frame 10 to provide support for the handle 45 and the drawer latch assembly 55 and 90, details shown in FIG. 3. Fitted into the drawer grooves 81 shown in FIG. 4 on the inner sides of the upper and lower support rails 20 and 15 is the drawer 80. The combination of the face plate 1, drawing frame 10, and support rails 20 and 15 operate effectively as a device frame.

Figure 2:
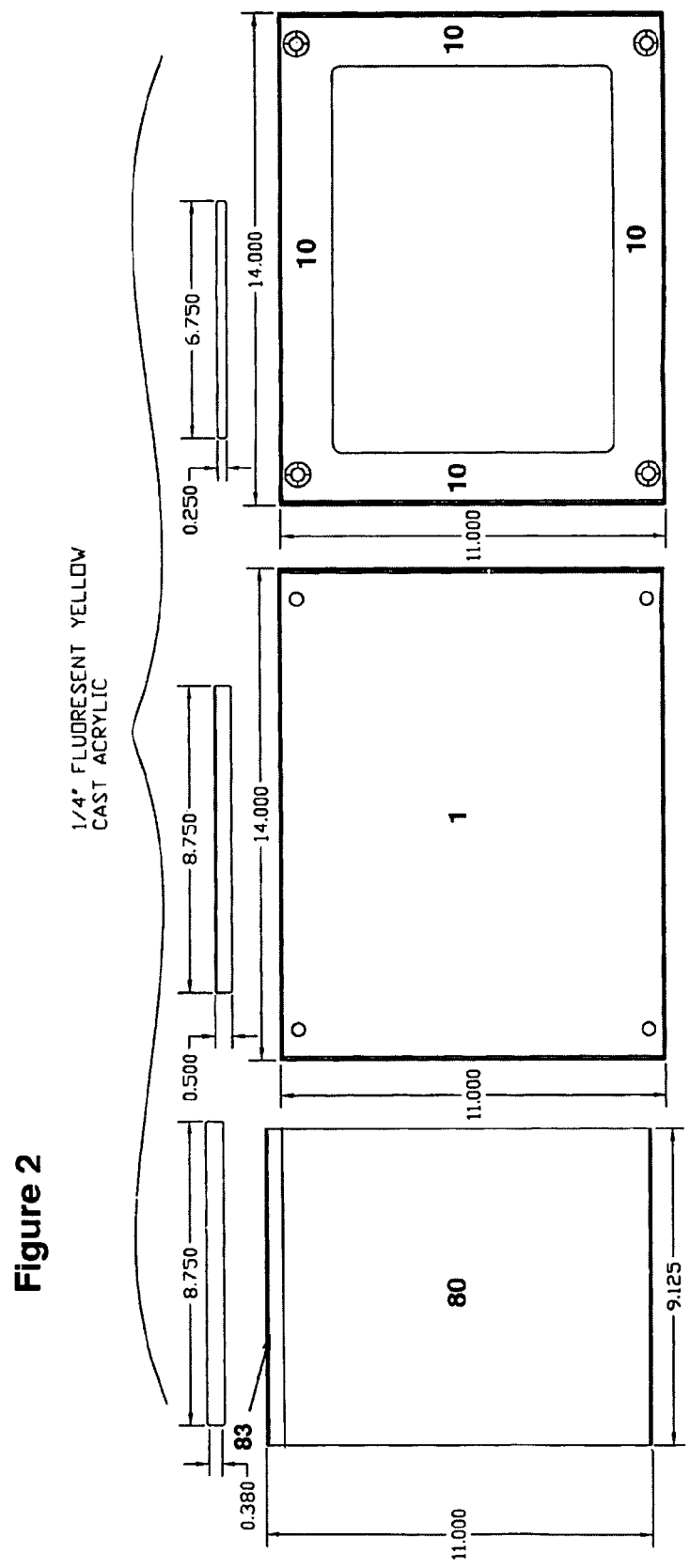
FIG. 2 is a detailed diagram showing a drawing frame, a face plate, and a drawer in the drawing tablet of the embodiment shown in FIG. 1.

As shown in FIG. 2, along the back edge of the drawer 80 is the ¼" high drawer clasp 83 that is grasped by the drawer release trigger 55 (shown in FIG. 1). The drawer release trigger 55 applies pressure to the drawer clasp 83 by use of a common rubber band (not shown) wound through a notch in the trigger 55 and attached to a nylon screw 75 in the upper support rail 20. This is used to keep the drawer 80 retracted when not in use. The surface of the drawer 80 can be provided with hook and loop material so that various writing and drawing instruments (not shown) that utilize the same material can be attached to it.

All the components of the submersible drawing and writing tablet are connected to each other through the use of the nylon screws 75. The width of the slot in these screws is designed to be used with a large coin such as a fifty-cent piece or a Peso rather than a screwdriver. In this way tools are not needed to assemble or disassemble the submersible tablet and the screws will resist stripping due to the lack of edges of the coins.

Figure 6:
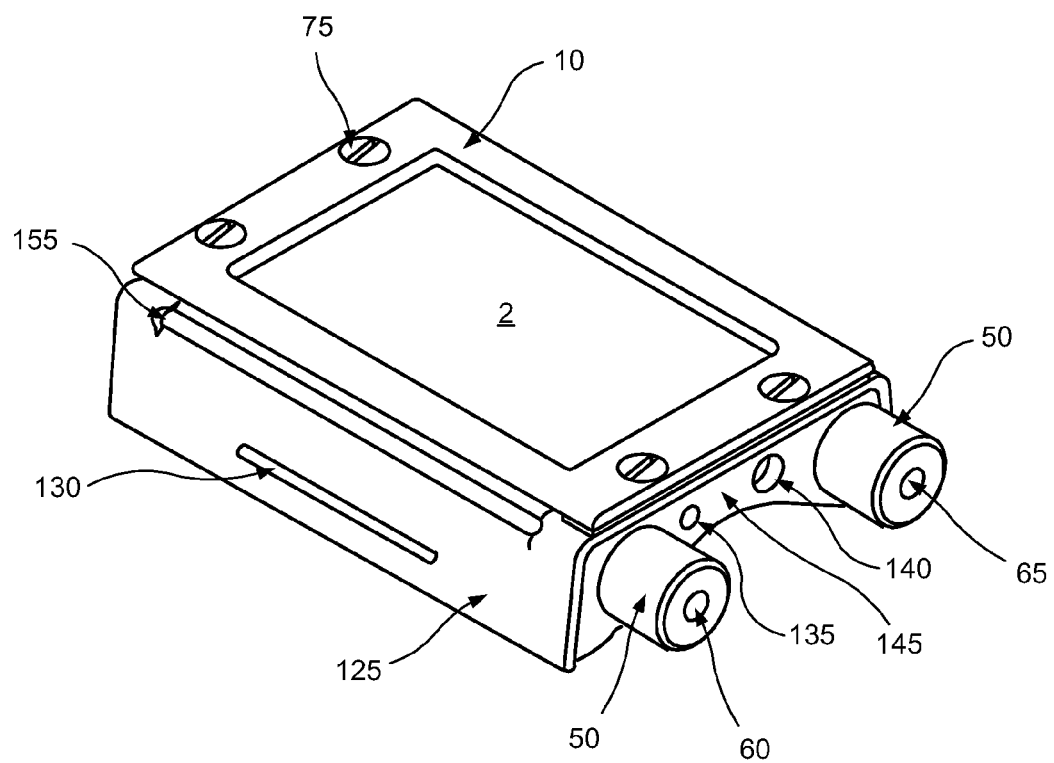
FIG. 6 is a perspective view of a drawing tablet, according to a second embodiment of the present disclosure.

A second embodiment of the present disclosure is shown in FIG. 6 and is a smaller version of the submersible writing tablet designed to be worn on the arm of the diver and used primarily for communication between scuba divers and for note taking. This second version also uses plastic vellum 2 stretched between two rollers 60 and 65 running parallel to the diver's arm. Writing on the vellum 2 is accomplished with a graphite pencil 170 held in a holder 140 under the drawing surface between the rollers. This smaller version does not have the utility drawer 80 of the larger version and is not designed to be collapsible. This wrist model also is constructed primarily of polycarbonate, acrylic and polypropylene.

The device shown in FIG. 6 is configured to be worn on the diver's arm through the use of a length of hook and loop material 160 that is attached to the underside of the tablet and can be adjusted to accommodate the circumference of the diver's arm by the use of the hook and loop material. The device is small enough so that it can also fit in a pocket or be attached by a lanyard, and/or other provisions (such as hook and loop material and/or otherwise), to the diver, or secured to another device, a surface, etc.

The second embodiment of the submersible writing and drawing tablet will now be described by referring to FIGS. 6-11. The overall submersible writing and drawing tablet is shown in FIG. 6.

All writing and illustration is accomplished on rolls of plastic vellum 2. The vellum 2 is wound onto the lower vellum roller 60. As in the first embodiment, the roller also has a vellum slot to grasp the vellum as it is being loaded onto the roller 60.

Figure 7:
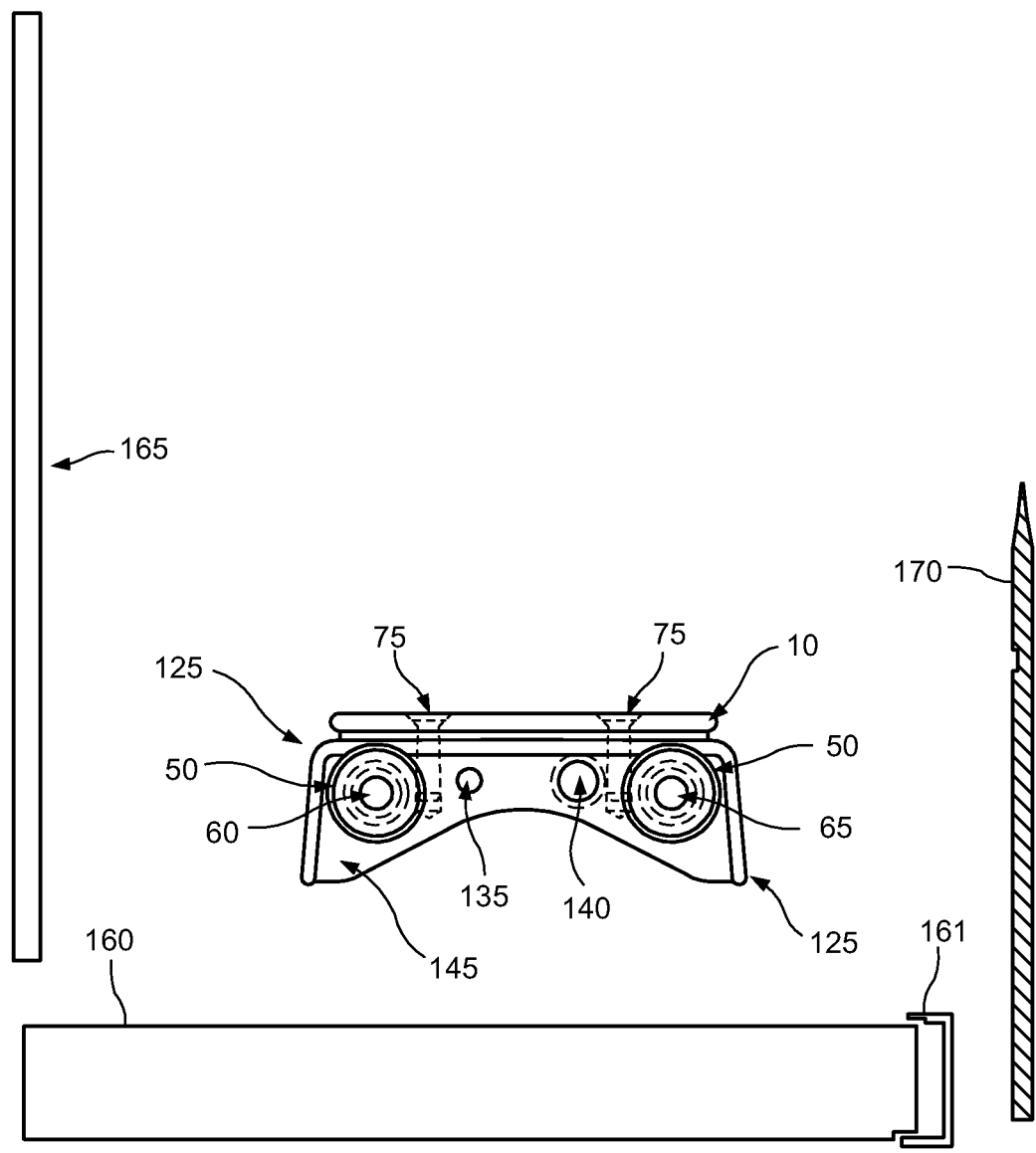
FIG. 7 is a side view of the drawing tablet according to the embodiment of FIG. 6.
Figure 8:
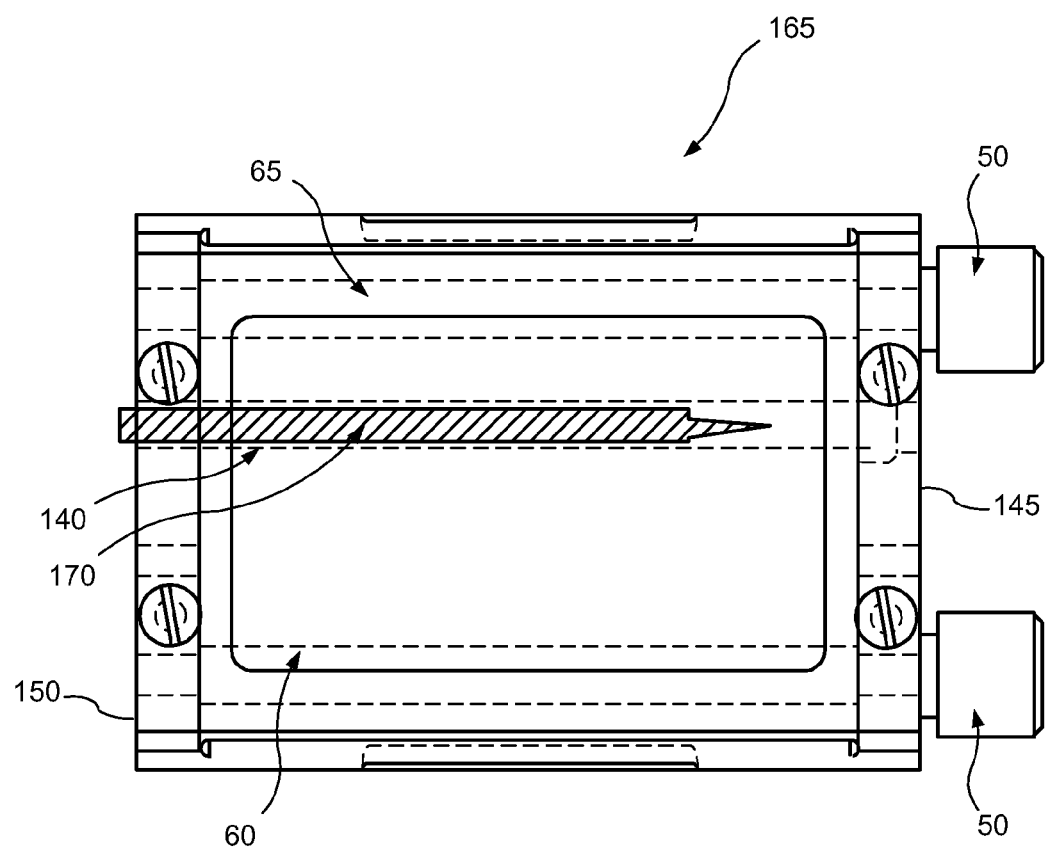
FIG. 8 is a top view of the second embodiment shown in FIG. 6.

The lower vellum roller 60 and the upper vellum roller are held in place by the right and left cover plate supports 145 and 150 shown in FIGS. 6 and 8. Both vellum rollers 60 and 65 fit into openings in the left cover plate support 150, shown in FIG. 8, and extend through and beyond openings in the right cover plate support 145. One of roller knobs 50 is attached by pressure fitting to the right ends of each of the vellum rollers 60 and 65, shown in FIGS. 6 and 7.

The second embodiment of the submersible writing tablet is not designed to be dismantled since its small size makes this unnecessary. The vellum is advanced or rewound by turning the rotation knobs 50. The plastic vellum 2 extends from the lower roller 60, through the lower vellum slot 155 over the cover plate 125 to the upper vellum roller 65. The cover plate 125 is constructed of phosphorescent polypropylene or plexiglass to aid with visibility under low light conditions. The vellum 2 then passes through the upper vellum slot 155 to the upper vellum roller 65 and, as in the first embodiment, is attached by means of a slot in the vellum rollers.

Figure 12:
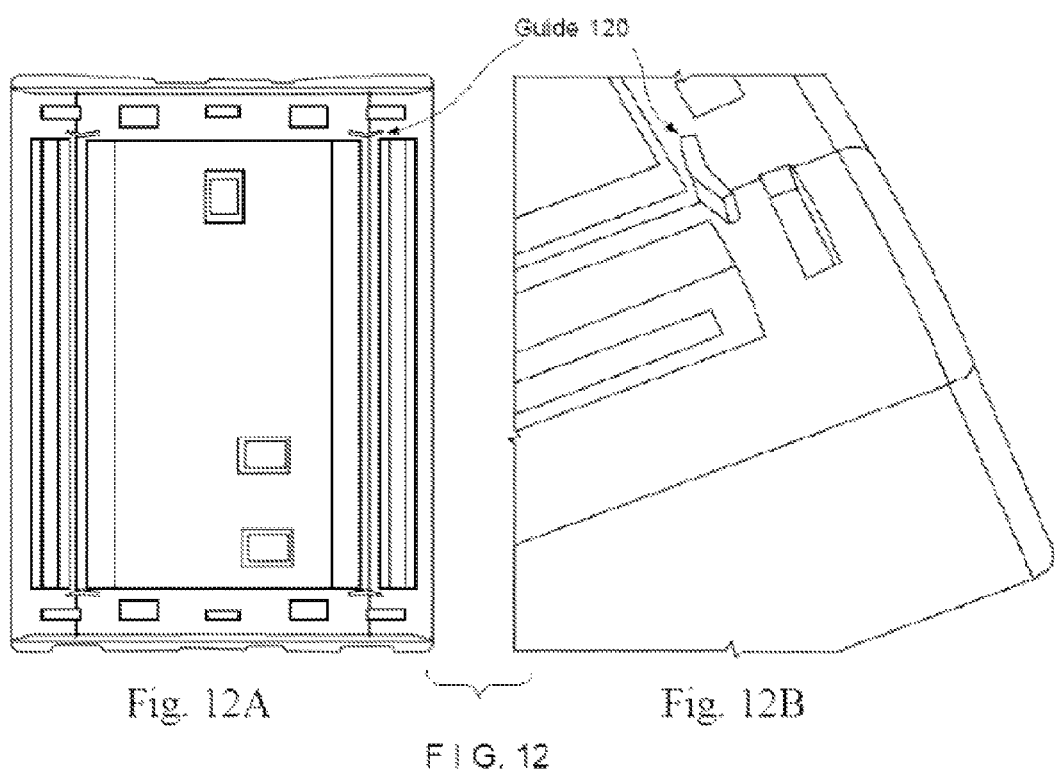
FIGS. 12A and 12B are views of a drawing tablet, according to another embodiment in which vellum guides are located on the top of a cover plate.

The vellum 2 is held in place by the drawing frame 10 that is attached to the cover plate 125 by means of four nylon screws 75 that pass through the cover plate 125 and thread into the left and right cover plate supports 145 and 150. Vellum 2 travels between cover plate 125 and drawing frame 10. In addition, the alignment of the vellum can be kept consistent through the use of vellum alignment guides 120 located on the top of the base (FIGS. 12A and 12B). Each of the vellum rollers can have a tension adjustment mechanism configured to apply pressure on the roller to maintain the tension of the plastic vellum sheet rolled around the rollers. Each of these mechanism can contribute to alignment of the vellum in an aligned position (that is, as the vellum is wound around the roller each layer aligns width-wise with the layer below it) so that the vellum does not become unaligned as the vellum is being wound around the roller. The combination of the drawing frame 10, cover plate 125, and supports 145 and 150 operate effectively as a device frame.

Pencil holder 140 is positioned between the upper and lower vellum rollers 60 and 65 and attached to openings in the left and right cover plate supports 145 and 150, shown in FIGS. 7 and 8. Next to the pencil holder 140 is a small opening 135 into which one end of rubberized pencil holding tube 165 is held therein. The other end of pencil holding tube 165 is stretched over one end of the graphite drawing pencil 170.

Figure 9:
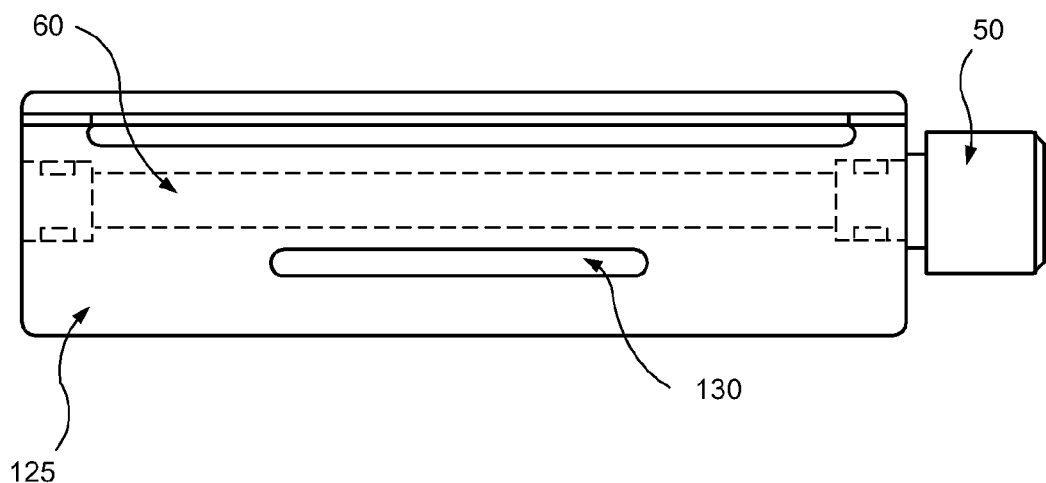
FIG. 9 is a side view of the second embodiment shown in FIG. 6.
Figure 10:
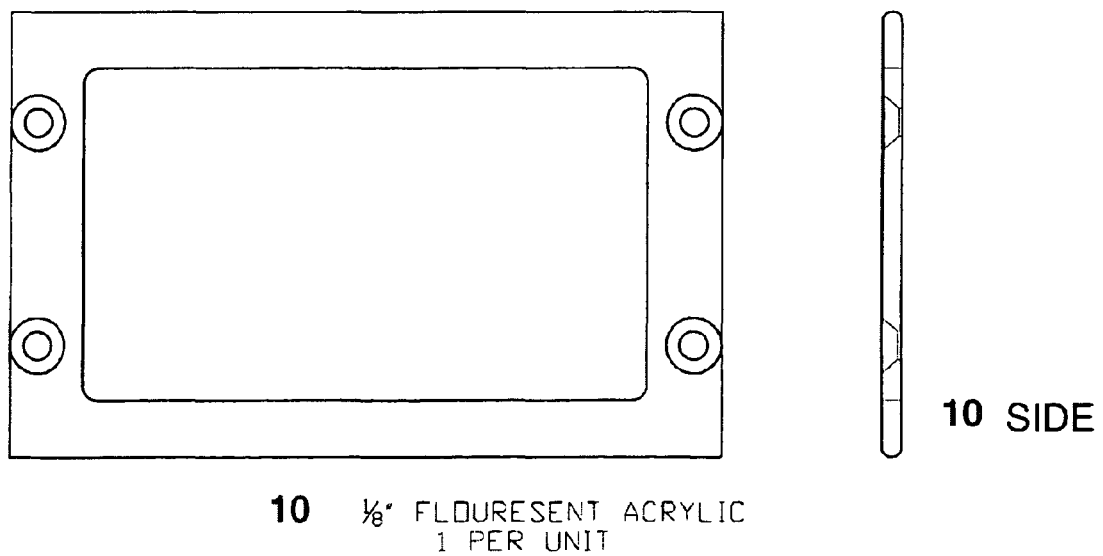
FIG. 10 is a detailed diagram showing a drawing frame of the second embodiment shown in FIG. 6.
Figure 11:
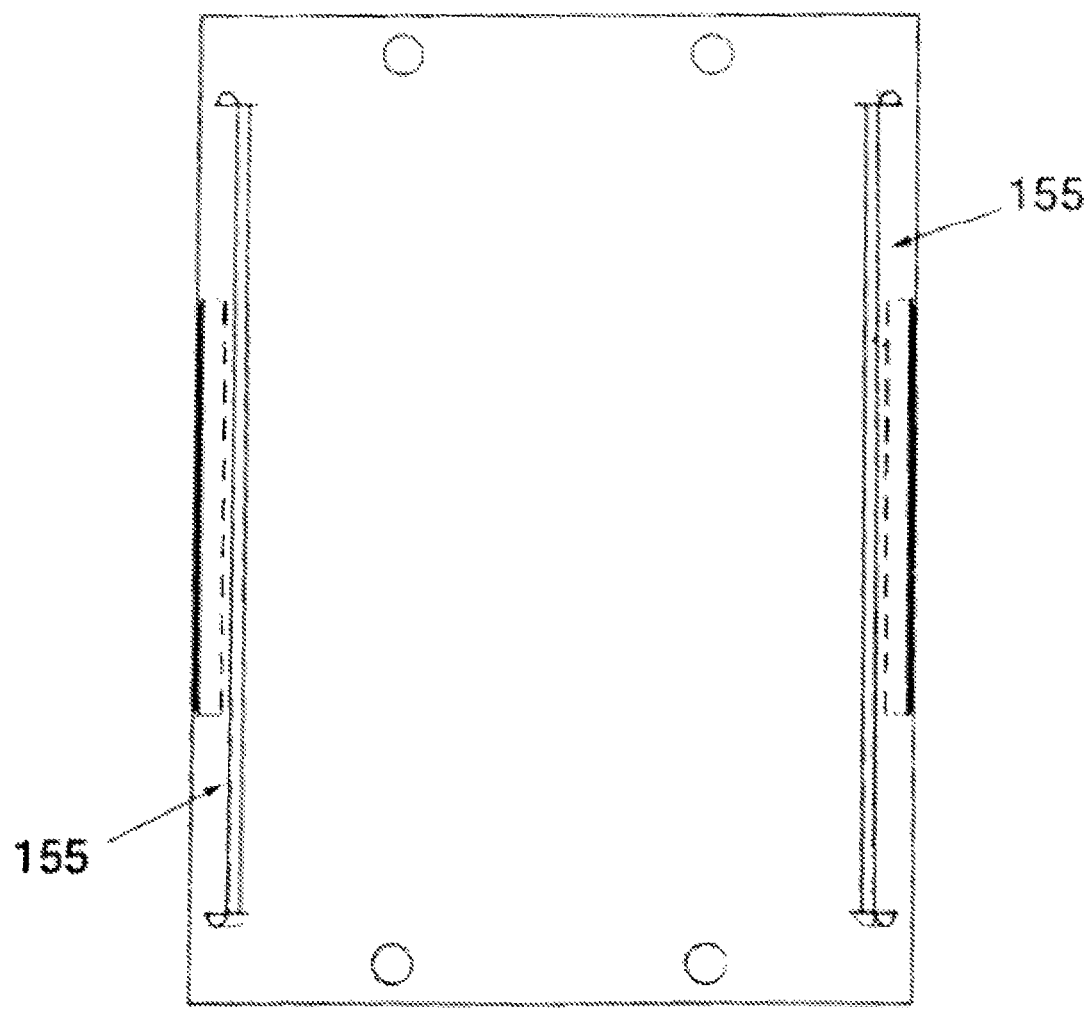
FIG. 11 is a top view of a cover plate of the second embodiment shown in FIG. 6.

The second embodiment of the submersible writing tablet is attachable to the diver's arm by means of a length of hook and loop material forming an arm belt 160 that passes through respective arm belt slots 130 on each side of the cover plate 125 as shown in FIGS. 6, 7, and 9. One end of the arm belt 160 passes through a plastic loop 161 sewn into the opposite end of the belt 160. The belt 160 is then folded back on itself and attached by means of the hook and loop material.

On the other hand, the device can be configured to be used even when not worn on the diver's arm. For example, the device can have various attachment points (such as handle 45, opening 135, pencil holder hole 140, slots 130, etc.) for the use of a lanyard. Other provisions (such as by means of hook and loop material and/or otherwise) may be included to secure the device to another device, a surface, etc.

The subject matter of this disclosure is particularly suited for use in an underwater environment.

Use of plastic vellum sheet is preferred because it is semi transparent and can be backlit by, for example, a phosphorescent material of the back plate, on night dives or dives in low light. In general, the distinct qualities of the vellum material renders it particularly suitable for the underwater environment and selection of the material of other parts and a writing implement are preferably complementary with it in the marine environment.

However, one of the properties of plastic vellum sheets is that they have a natural tendency to unravel. Accordingly, the writing tablet preferably includes means which help to maintain tension of the plastic vellum sheet rolled around plastic rollers in the writing tablet, even when the rollers are not being rotated. A consistent tension is applied to the vellum sheet between the rollers so that the vellum sheet will remain flat and will not rewind, jam or release from the roller slots, during use underwater or in any extreme environment. When underwater, in high wind or low gravity, air or water can get behind the vellum causing it to "balloon" up from the back plate making writing difficult and causing the vellum to unroll or unwind, if a tensioning mechanism is not included.

A tension adjustment mechanism (for example, knob 50 in FIG. 1, a screw, etc.) can be provided to maintain tension of the plastic vellum sheet rolled around the rollers. In another example, vellum slots (for example, 155 in FIGS. 6 and 11) are provided in the cover plate, and maintain a consistent tension in the vellum sheet when the plastic vellum sheet is rolled around the rollers, placed over the cover plate and passes through the vellum slots. In addition, each of the rollers includes one or more slots, with the one or more slots grasping the vellum when the vellum is loaded on the roller, and thus by maintaining a consistent tension on the vellum between the rollers and the vellum sheet will not release from the roller when the roller is not being turned. The tensioning mechanism also keeps the writing surface of the vellum flat against the face plate (FIG. 1, #1) in any extreme environment such as underwater, high wind or low gravity situations.

In addition, when a device is used in the marine environment it should preferably be able to shed water and air quickly when it enters or leaves the water, and should preferably also be designed so that there are no areas where miscellaneous corroding agents such as sand and salt can be retained. The device is preferably robust enough to hold up to the rigors of the demanding scuba environment.

Accordingly, one or more of the following optional features directed to use in an underwater environment can also be included: (a) a woodless graphite drawing pencil is attached to the writing tablet via a flexible holding tube; (b) the cover plate is formed of a phosphorescent material; (c) the underwater writing tablet is formed to have a negative buoyancy at depth of about 50 feet; (d) the underwater writing tablet is made of one or more materials that are resistant to corrosion and/or impervious to salt water and intensive exposure to sunlight; (e) the underwater writing tablet does not retain air in the underwater environment and does not retain water when removed from the underwater environment; (f) a grid pattern (or other pattern or information) is visually presented via the plastic vellum sheet, such as by pre-printing such pattern or information on the vellum; (g) a mechanism (for example, one or more slots in the rollers which grasp the vellum when the vellum is loaded on the roller) to maintain a consistent tension on the vellum between the rollers and maintain a flat writing surface while preventing the vellum from becoming disengaged from the rollers during use.

Figure 13:
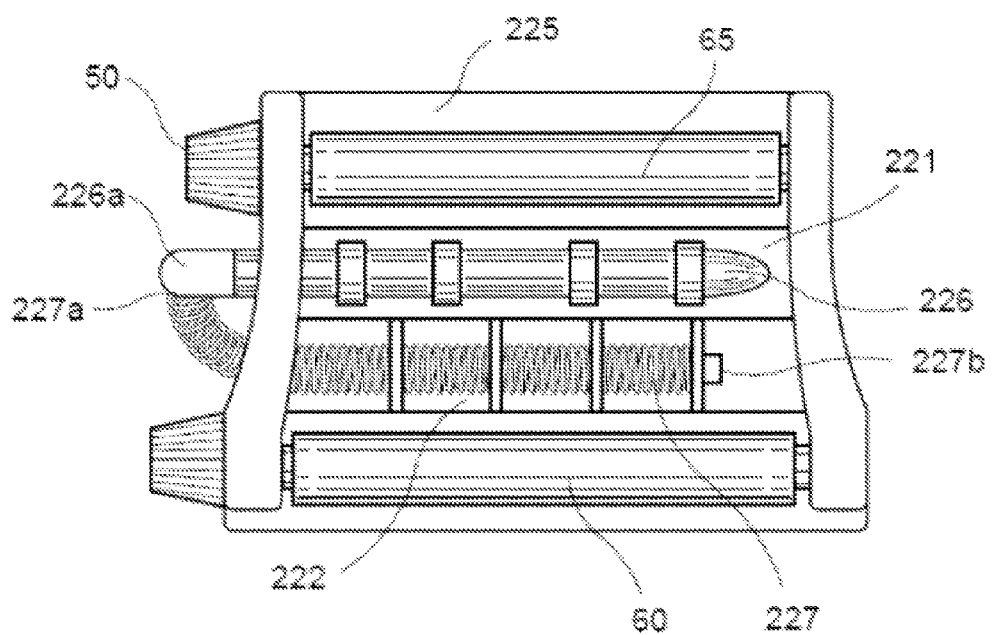
FIG. 13 illustrates a bottom view of a drawing tablet, according to another exemplary embodiment.
Figure 16A:
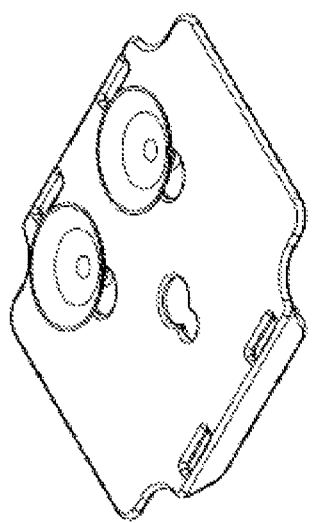
FIGS. 16A and 16B illustrate an example in which suction cups are inserted in the keyholes of the holder device shown in FIGS. 15A-15H.
Figure 16B:
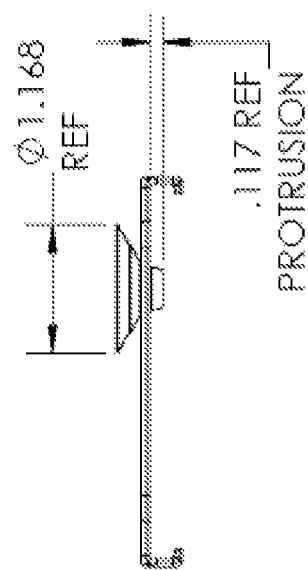

A bottom view of another exemplary embodiment is shown in FIG. 13. The embodiment illustrated in FIG. 13 is similar to the second embodiment (FIGS. 6-11). In the tablet illustrated in FIG. 13, a storage member (in the form of a compartment) is provided between vellum rollers 60 and 65. The storage member as shown in FIG. 13 includes two ports, 221 and 222. Storage port 221 is configured for storage of a writing implement (such as a pencil) 226. It should be appreciated that such writing implement is preferably secured to the tablet, such that after the writing implement has been withdrawn from the storage port 221, the diver need not keep track of the implement and instead can be assured that the implement has not been lost. In the example of FIG. 13, the implement 226 is coupled to the tablet via lanyard 227. The lanyard 227 is preferably retractable (e.g., coiled in FIG. 13) in order to reduce the space it occupies and minimize the chances of entanglement (with the diver or dive equipment) through its retractability, as well as allow the lanyard to be more readily stored in storage port 222. One end 227a of the lanyard 227 is attached to a lanyard attachment cap 226a which may be a part of the writing implement 226, and/or the cap 226a may be coupled to the end 227a of the lanyard 227 and have a shape complementary to the end of the writing implement 226 so as to be slippable over the end of the writing implement 226 in a snug and secure manner. Further, although the embodiment shown in FIG. 13 is configured for accommodating a writing implement, it can be useful even when the lanyard 227 does not have a writing implement attached thereto, but the attachment end is instead configured for attachment to a body part (e.g., wrist, arm, waist, neck, etc.) of the user.

Other useful features may be provided as well. As discussed supra, the plastic vellum is a suitable medium for recording information in many circumstances under water or in an extreme environment. In addition, the vellum sheet can have pre-recorded information thereon. As one might appreciate, the diver should take many preparatory and precautionary measures before undertaking a dive. In many instances, it would be prudent to take such measures in advance of the dive. However, experienced divers will appreciate that it often occurs that the diver will perform a last minute check, or may perform a check while in the water, and in such circumstances, it is desirable to have a dive safety check list (see, for example, FIG. 14 for a segment of such a check list) handy.

On the other hand, a check list on paper would not be suitable under such circumstances, for obvious reasons. Instead, it would be helpful to have such information pre-recorded on the vellum sheet, to allow the diver to have the checklist in a handy and practical manner under the circumstances.

Other types of dive information can also be pre-recorded on the plastic vellum. For example, various information determined in a dive plan (such as depth, bottom time and limits, cylinder ending pressure, next deeper depth and next bottom time limits, etc.) can be pre-recorded.

Further, the dive information pre-recorded on the plastic vellum may be a dive log.

Such prerecorded information may be useful not only to the diver but also to a dive buddy, without requiring the diver to communicate such information to the diver buddy underwater via gestures and the like.

The above-described examples and exemplary embodiments are illustrative, and many variations can be introduced on these examples and embodiments without departing from the spirit of the disclosure or from the scope of the appended claims. For example, elements and/or features of different examples and illustrative embodiments may be combined with each other and/or substituted for each other within the scope of this disclosure and appended claims.

Some additional features may be included in a drawing and writing tablet, including the following.

For example, writing and drawing on the drawing and writing tablet is preferably of a permanent nature.

In addition, the drawing and writing tablet preferably is configured to provide an unlimited amount (that is, a large amount that exceeds an amount that can be consumed in one or a few dives) of workable media underwater.

Also, the drawing and writing tablet is preferably configured to provide workable media quickly and easily in an underwater environment, for example, through use of scrolling mechanism rather than pages which require flipping.

Further, the tablet preferably provides a writing and drawing surface that is phosphorescent to accommodate working in low light conditions.

In addition, the tablet is preferably configured to have a buoyancy underwater that renders it nearly weightless and to shed air and water so as not to encumber the diver as he or she enters or leaves the water.

Further, while the tablet-type device can be configured to have a buoyancy such that it is very easy to manipulate underwater and will not sink or ascend rapidly if let go, it is nevertheless often desirable to be able to secure the device another device, a surface, the user, etc. Such means may include hook and loop material, lanyards, handles, etc.

Another example is a device holder, such as shown in FIGS. 15A-15H. In the example shown in FIGS. 15A-15H, the dimensions of the device accommodate a device of a corresponding complementary size, such dimensions would of course vary according to the size of the complementary device. The device holder may be mounted on a surface (arranged horizontally, vertically, or otherwise) in the workspace of the user. When the user needs to have free hands, and/or the device needs to be secured, the device may be inserted (e.g., slid) into the holder.

In the example shown in FIGS. 15A-15H, the holder includes plural keyholes to enable the holder to be readily attached via various fastening means to the surface. For example, screws or nails having a geometry complementary to that of the keyholes may be inserted in such surface, and the keyholes can thus be mated to such screws or nails. On the other hand, suction cups configured to have insertion members of complementary shape can be inserted alternatively in the keyholes, to allow the holder to be readily secured to, and removed from, any of various available surfaces.

Also, the drawing and writing tablet can be configured to be easily disassembled for travel.

As mentioned supra, this disclosure is a continuation-in-part of U.S. patent application Ser. No. 13/012,282 filed Jan. 24, 2011 which in turn is a continuation-in-part of U.S. patent application Ser. No. 11/899,258 filed Sep. 4, 2007 (now U.S. Pat. No. 7,874,843) which in turn is a continuation-in-part of U.S. patent application Ser. No. 10/842,385 filed May 10, 2004 (now U.S. Pat. No. 7,264,477), which claims the benefit of U.S. Provisional Application No. 60/471,489, filed May 15, 2003, and in addition, related U.S. patent application Ser. No. 11/897,968 filed Aug. 31, 2007 (now U.S. Pat. No. 7,731,501) is a divisional of application Ser. No. 10/842,385. The entire contents of each of the aforementioned preceding applications are herein incorporated by reference.

What is claimed is:

1. A device configured for use to capture information in an underwater environment or in a severe environment, comprising:
   two vellum rollers coupled to a device frame;
   a vellum sheet rolled around each of the two vellum rollers;
   a tension adjustment mechanism configured to maintain a consistent tension in the vellum sheet wound around the vellum rollers, a portion of the vellum sheet being provided to capture information in the underwater or severe environment; and
   a fastening part coupled to the device frame and configured to be fastened to a complementary part of another device or surface or a user.

2. The device according to claim 1, wherein the fastening part includes a hook and loop material and an attachment end configured to be attached to a body part of the user.

3. The device according to claim 1, wherein the fastening part includes a strap inserted in a slot in the device frame of the device, the strap being secured by a hook and loop material and further including an attachment end configured to be attached to a body part of the user.

4. The device according to claim 1, wherein the fastening part includes a strap inserted in plural slots disposed in a lower side or underside of the device, the strap being configured with hook and loop material to permit the strap to be wrapped around a body part of the user.

5. The device according to claim 1, wherein the fastening part includes a handling member configured to be held by hand by the user and configured for insertion of a strap therethrough, the strap being secured by a hook and loop material and further including an attachment end configured to be attached to a body part of the user.

6. The device according to claim 1, wherein the fastening part includes a lanyard including an attachment end configured to be attached to another device or a body part of the user.

7. The device according to claim 6, wherein the lanyard is a retractable lanyard.

8. The device according to claim 6, further comprising a storage part configured to hold the lanyard.

9. The device according to claim 1, further comprising:
   a device holder member configured to accommodate the device frame and provided with plural keyholes to receive complementary fastening parts for securing the device holder to a surface.

10. The device according to claim 1, further comprising:
    a device holder member configured to accommodate the device frame and provided with plural keyholes; and
    plural suction cups configured to have insertion members having a shape complementary to the keyholes and inserted in the complementary keyholes for securing the device holder to a surface.

11. The device according to claim 1, further comprising a lanyard inserted in an insertion hole in the device frame and including an attachment end configured to be attached to attached to a body part of the user.

12. The device according to claim 11, wherein the lanyard is coiled and the device further includes a storage part configured to hold the coiled lanyard.

13. The device according to claim 1, wherein
    the device frame and the vellum rollers are made of materials having a slightly negative buoyancy at a depth of fifty feet so that the tablet does not sink or ascend rapidly underwater.

* * * * *